(12) United States Patent
Huang et al.

(10) Patent No.: US 12,548,974 B1
(45) Date of Patent: Feb. 10, 2026

(54) LASER POWER MONITOR

(71) Applicant: ACACIA TECHNOLOGY, INC., San Jose, CA (US)

(72) Inventors: Xue Huang, Maynard, MA (US); Christopher Doerr, Maynard, MA (US)

(*) Notice: Subject to any disclaimer, the term of this patent is extended or adjusted under 35 U.S.C. 154(b) by 1123 days.

(21) Appl. No.: 17/363,882

(22) Filed: Jun. 30, 2021

Related U.S. Application Data

(60) Provisional application No. 63/046,799, filed on Jul. 1, 2020.

(51) Int. Cl.
H01S 5/026 (2006.01)
H01S 3/13 (2006.01)
H01S 5/0683 (2006.01)

(52) U.S. Cl.
CPC .......... *H01S 5/0264* (2013.01); *H01S 3/1305* (2013.01); *H01S 5/0683* (2013.01)

(58) Field of Classification Search
CPC ..... H01S 5/0264; H01S 3/1305; H01S 5/0683
See application file for complete search history.

(56) References Cited

U.S. PATENT DOCUMENTS

| | | | |
|---|---|---|---|
| 2007/0116076 A1* | 5/2007 | Wang | H04B 10/564 372/38.07 |
| 2010/0158055 A1* | 6/2010 | Giebel | G06K 7/10584 372/29.011 |

* cited by examiner

*Primary Examiner* — Yuanda Zhang
(74) *Attorney, Agent, or Firm* — Patterson + Sheridan, LLP

(57) ABSTRACT

In part, the disclosure relates to a method of controlling power output of a tunable laser. The method may include changing optical loss during a first time period; recording gain chip voltage V value changes and optical output power P value changes during the first time period; and compensating for changes in gain chip voltage and/or gain chip current, using a feedback control loop, based on the correlation between optical output power P change and gain chip voltage V change, due to optical loss changes measured during the first time period.

18 Claims, 6 Drawing Sheets

LASER POWER MONITOR

CROSS REFERENCE TO RELATED APPLICATIONS

This application claims priority to and the benefit of U.S. Provisional Patent Application No. 63/046,799 filed on Jul. 1, 2020, the disclosure of which is herein incorporated by reference in its entirety.

FIELD

This disclosure relates generally to the field of power management and control in optical communication systems.

BACKGROUND

Contemporary optical communications and other photonic systems make extensive use of photonic integrated circuits that are advantageously mass-produced in various configurations for various purposes.

SUMMARY

In part, in one aspect, the disclosure relates to a method of controlling power output of a tunable laser. The method may include changing optical loss during a calibration period; recording gain chip voltage V value changes and optical output power P value changes during the calibration period; and compensating for changes in gain chip voltage and/or gain chip current, using a feedback control loop, based on the correlation between optical output power P change and gain chip voltage V change, due to optical loss changes measured during calibration period.

In one embodiment, the feedback control loop includes one or more linear models, wherein each linear model includes a coefficient determined in response to changes in optical losses of laser. In one embodiment, the method may further include fitting P as a function of V to obtain a first coefficient. In one embodiment, the method may further include recording gain chip current I value changes and optical output power P value changes during the calibration period. In one embodiment, the method may further include fitting P as a function of I to obtain a second coefficient. In one embodiment, the method may further include recording gain chip current I value changes and gain chip V value changes during the calibration period. In one embodiment, the method may further include fitting V as a function of I to obtain a third coefficient. In one embodiment, the method may further include mitigating gain-chip-to-PIC coupling efficiency degradation using the feedback control loop, wherein the feedback control loop includes a linear model calibrated using optical loss changes. In one embodiment, the calibration period is a sweep period. In one embodiment, one or more steps of the method are performed using a microprocessor.

In part, in another aspect, the disclosure relates to a method of controlling power output of a tunable laser. The method may include reading an I value and a V value from a gain chip of a laser; calculating a $\Delta P1$ value; calculating a $\Delta P2$ value; determining a $I_{NEW}$ value; and applying the $I_{NEW}$ on a gain chip.

In one embodiment, one or more steps of the method are performed using a microprocessor. In one embodiment, the method may further include repeating all steps during operation of the tunable laser. In one embodiment, $\Delta P1=(I-Ic)\times KPI$, wherein Ic is a calibration current value and KPI is a first linear coefficient.

In one embodiment, $\Delta P2=(V-Vc)\times Kpv$ and Vc is a calibration voltage value and Kpv is a second linear coefficient. In one embodiment, $Inew=I-g*(\Delta P1+\Delta P2)$, wherein g is a proportionality factor. In one embodiment, the Ic and Vc are obtained during a calibration period. In one embodiment, the method further includes varying optical losses of tunable laser during the calibration period. In one embodiment, applying the $I_{NEW}$ on a gain chip adjusts the power output of the tunable laser.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
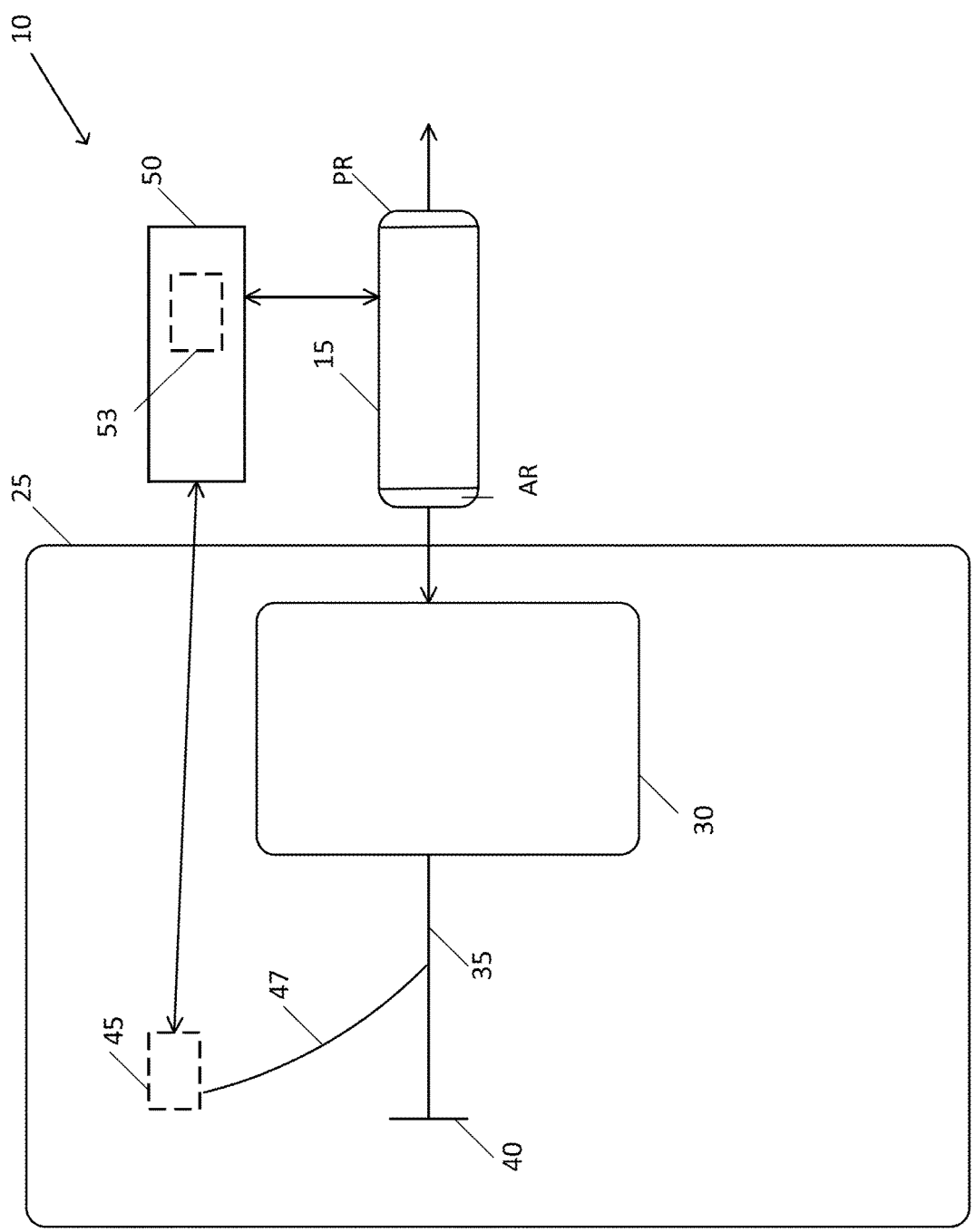
FIG. 1 illustrates a high level component diagram of a laser-based system implementing a power monitoring and control method according to an exemplary embodiment of the disclosure.

In many embodiments, the current disclosure may enable a power control method and/or control system to achieve and to maintain a target optical output power from a tunable laser (TL). In some embodiments, the current disclosure may enable accurate monitoring of an optical output power from a partial reflection or partially reflective (PR) coated gain chip output facet.

In certain embodiments, photodiodes (PDs) on a Si photonic integrated circuit (PIC) die, which is optically coupled to an anti-reflection or anti-reflective (AR) coated side of a gain chip, may provide single mode selection and wavelength tuning functions. In many embodiments, by using PDs connected to waveguide taps on the PIC die, with pre-calibration and fitting on PD current dependence on optical output power from the partial reflection coated side, it may be possible to provide in-situ power monitoring during laser operation.

In some embodiments, Applicants have realized that a PD current may monitor an optical output from an anti-reflection coated side of a gain chip, which may not be directly correlated to an output power from a partial reflection coated side, when optical loss seen by the gain chip changes. In many embodiments, Applicants have realized that optical loss change may include gain-chip-to-PIC coupling efficiency degradation, which may occur during long-term operation of a tunable laser, and from wavelength-dependent optical output power due to constructive and destructive interference between main resonance and parasitic reflection by a gain-chip-PIC coupling joint.

In certain embodiments, a voltage drop on gain chip may be used to monitor optical output power. In most embodiments, for semiconductor lasers, a voltage drop V of diode junction may be proportional to ln(N), where N is the threshold carrier density and is exponentially dependent on optical loss $\alpha$. In many embodiments, voltage V and optical loss $\alpha$ may be linearly correlated. In almost all embodiments, by using voltage as the power monitor, the optical loss caused power change may be inferred from a voltage change. In some embodiments, a power control loop may be established by using voltage reading as feedback, to set and maintain the laser power at the target value.

In part, the disclosure relates to control systems and methods to control output power of a laser such as a tunable laser. Various techniques may be used improve one or more laser parameters such as its optical output power. Refer now to the example embodiment of FIG. 1, a schematic diagram of a system 10 that includes a gain chip 15 and an arrangement of one or more optical or laser components 25 is depicted. The one or more components 25 of the laser may be implemented in free space, as a chip such as a PIC, through other configurations, and combinations thereof. The one or more components 25 in optical communication with the gain chip may include a wavelength-selection device or subsystem. In some embodiments, the one or more components 25 may be implemented as a PIC. Further, the one or more components 25 may include one or more laser cavity portions that are in optical communication with each other and the gain chip 15.

One or more optical filters 30 for wavelength tuning may also be in optical communication with the gain chip 15. The gain chip 15 may include a first end face and a second end face. In some embodiments, the first end face of the gain chip has an AR coating. In various embodiments, the second end face of the gain chip has a PR coating. References to first and second end face can be reversed in some embodiments. The end face having the AR coating is in optical communication with the one or more components 25 of the laser. The end face having the PR coating transmits light from an optical output that may be used to carry communication signals such as through various frequency-based and other multiplexing schemes. The gain chip 15 also includes one or more inputs for each of current and voltage. The gain chip may send and receive signals, current, and voltages changes to a control system 50. In various embodiments, the control system is in electrical communication with the gain chip and transmits or changes or provides different current values to the gain chip. The control system 50 also reads the corresponding voltage on the gain chip in various embodiments. The current value that the control system applies to the gain chip may be calculated by a microprocessor or other processor or circuit or combination thereof. The microprocessor or other devices suitable for calculating or determine applied current values 53 for gain chip may be part of control system 50 or in communication therewith.

The one or more components 25 of the laser may also include one or more optical paths such as optical path 35 that include linear, curved and loop segments. In some embodiments, the various optical paths define at least a portion of the laser cavity. In various embodiments, the optical path 35 is in optical communication with a reflector 40. In some embodiments, an optional photodiode 45 is in optical communication with the optical paths 35 through an optical tap or other optical path 47 in order to detect optical signals once transmitted to the photodiode 45.

The system of FIG. 1 may also include a control system 50. The control system 50 may include one or more circuits, optical or electrical inputs and outputs, and one or more processors or microprocessors and control signal lines. In various embodiments, the control system is in electrical communication with the photodiode 45 and operable to receive electrical signals correlated with optical signals measured by the photodiode and voltage or current change from the gain chip during calibration and preferred target operating modes. In many embodiments, the photodiode 45 is optional and not used in conjunction with the systems and methods disclosed herein. The control system 50 may process and evaluate such signals using various methods as disclosed herein and generate control signals. In turn, in various embodiments, the control signals may be specified using the various current and voltage related adjustments and feedback-based processes described herein.

In various embodiments, the laser includes or is in optical communication with a wavelength-selection device or subsystem. In some embodiments, the wavelength-selection device or subsystem may include one or more of a cavity, optical paths, such as loops or rings or linear paths and combinations thereof, a reflector, optical taps, an optional photodiode, optical and electrical connections and channels, a processor, microprocessor, photonic circuit, ASIC, and other optical or electro-optical or electrical components. In various embodiments, a photodiode may be used to monitor the optical power value of time in the wavelength-selection element or portion of the laser cavity. Unfortunately, the correlation between optical power measured relative to the laser optical output and the laser cavity or the wavelength selection element, which may be the same, is often poor.

In light of the poor correlation associated with using a photodiode to support a comparative optical power measurement, other methods and systems with improved results are of interest. In some embodiments, the methods and systems disclose herein perform a calibration process. Further, in some embodiments, the calibration method measures how optical output power deviation is correlated with gain chip voltage V deviation, when the optical cavity loss is changed while the current is unchanged.

To develop a feedback loop as part of a control system based on the deviation in optical power noted above, it is useful to consider the process of calibrating a laser and the interrelationship of power P, voltage V, and current I. In some embodiments, a series of measured data points during the calibration of a laser may be fit to a linear relationship as a function of power in one instance and current in a second instance. In various embodiments, calibration values for V, I, and P, such as $V_c$, $I_c$, and $P_c$, may be used to in conjunction with a curve fitting process or linearization of one or more models to obtain target operating values for the laser such as $V_t$, $I_t$, and $P_t$. In various embodiments, y-intercept values such as a, b, and c may be determined for the various linear relationships described herein and are obtained from the fitting process and the underlying data points that are measured or recorded during different time periods of interest, such as a calibration period, sweep period, or other data collection period of interest relating to operation or calibration of a laser embodiment or a component of one of the systems or devices disclosed herein. In various embodiments, a calibration process may be performed to obtain various values to establish various models such as linear models. The various models may be use in conjunction with a control loop to adjust and control the power output of a tunable laser. In some embodiments, the calibration process is a method of characterizing the properties of a given tunable laser in support of controlling the laser in an optimal manner based upon various parameters measured during the characterization/calibration process. In various embodiments, the laser-specific parameters measured during the characterization/calibration process improves the output power control of the laser by tailoring specific gain chip adjustments to a specific laser that may include various features that vary across different lasers.

In some embodiments, calibration of a laser may include one or more of the following steps. Initially, sweeping the current I of the gain chip is performed. In various embodiments, voltage values V and power values P are measured as the current I is simultaneously swept during a sweep period. In some embodiments, the initial sweep period corresponds to a calibration period. In one embodiment, the current I is swept by the control system. In some embodiments, sweeping includes sweeping over a range of operating wavelengths that the tunable laser is able to transmit as an output signal. Power P and voltage V are a function of the swept current generally and during the current sweeping during calibration. The various current values may be paired with measured/recorded power values P and voltage values V, respectively, and plotted as shown in example embodiments of FIGS. 2 and 3, respectively.

Refer now to the example embodiment of FIG. 2, the plotted power values P and current values I may be fit to the first equation shown below (Eq. 1). The value $k_{PI}$ corresponds to the slope of the line fit to set of data points plotted in FIG. 2. The a value corresponds to intercept. Similarly, in the exemplary embodiment of FIG. 3, the plotted voltage values V and current values I may be fit to the second equation shown below (Eq. 2). The value $k_{VT}$ corresponds to the slope of the line fit to set of data points plotted in FIG. 3. The b value corresponds to intercept. In this way, P and V may be linearized with regard to I, per Eq. 1 and Eq. 2, respectively.

$$P = k_{PI} \times I + a \quad \text{(Eq. 1)}$$

$$V = k_{VT} \times I + b \quad \text{(Eq. 2)}$$

In some embodiments, the calibration process also includes sweeping the laser over a range of optical loss values. In various embodiments, sweeping performed by control system 50. In some embodiments, the one or more optical filters for wavelength tuning 30 discussed above with regard to FIG. 1 may be used as part of the sweeping process. Additional details related to laser sweeping is also provided herein with regard to laser embodiment described in the exemplary embodiment of FIG. 6. In various embodiments, changing optical filter misalignment for a given tunable laser embodiment is performed to sweep over a range of optical loss values. During the sweep period when optical loss values are changing, measuring/recording optical power values and voltage values is also performed. In some embodiments, sweeping may also be performed by changing optical filter phases.

In the example embodiment of FIG. 4, the plotted power values P and voltage values V may be fit to the third equation shown below (Eq. 3). The value $k_{PV}$ corresponds to the slope of the line fit to set of data points plotted in FIG. 4. The fitting or linearization of optical power P by voltage V may be related by Eq. 3. The c value corresponds to intercept value that results from the process of fitting a line to the set of measured values during the sweep or data collection period.

$$P = k_{PI} \times V + c \quad \text{(Eq. 3)}$$

In most embodiments, with the calibration results from two steps described herein, a power control loop may be implemented for in-situ power monitoring and correction, to achieve and maintain optical power P. If the target power is $P_t$, from Equation (1), the current from the calibration process Ic may be obtained to be as shown below in Eq. 4.

$$I_C = (P_t - a)/k_{PI} \quad \text{(Eq. 4)}$$

But when Ic was calibrated as in Equation (1), it was under a specific optical loss which is represented by the voltage in (Eq. 2) and specified as the calibrated voltage Vc as shown below:

$$V_C = k_{VT} \times I_C + b \quad \text{(Eq. 5)}$$

If the actual voltage V which is monitored during normal laser operation is different from Vc in Eq. 5, the optical power is different from $P_t$, due to a different optical loss. In various embodiments, the actual voltage (V in the example embodiment of FIG. 5) is read by laser electronics, which may include control system 50 or other voltage monitoring circuits or ASICs. In most embodiments, the actual V is compared with Vc, which is calculated in Eq. 5. Therefore, to reach and maintain the target power for the tunable laser Pt, a control method or control loop may be used to calculate and compensate for the change in power caused by optical loss or other factors. This deviation in optical loss from the calibration stage to normal operation of the calibrate laser is detected using circuits and microprocessor, such as control system 50, for laser control, which reads back the actual voltage V and compares it with Vc in Eq. 5.

Figure 2:
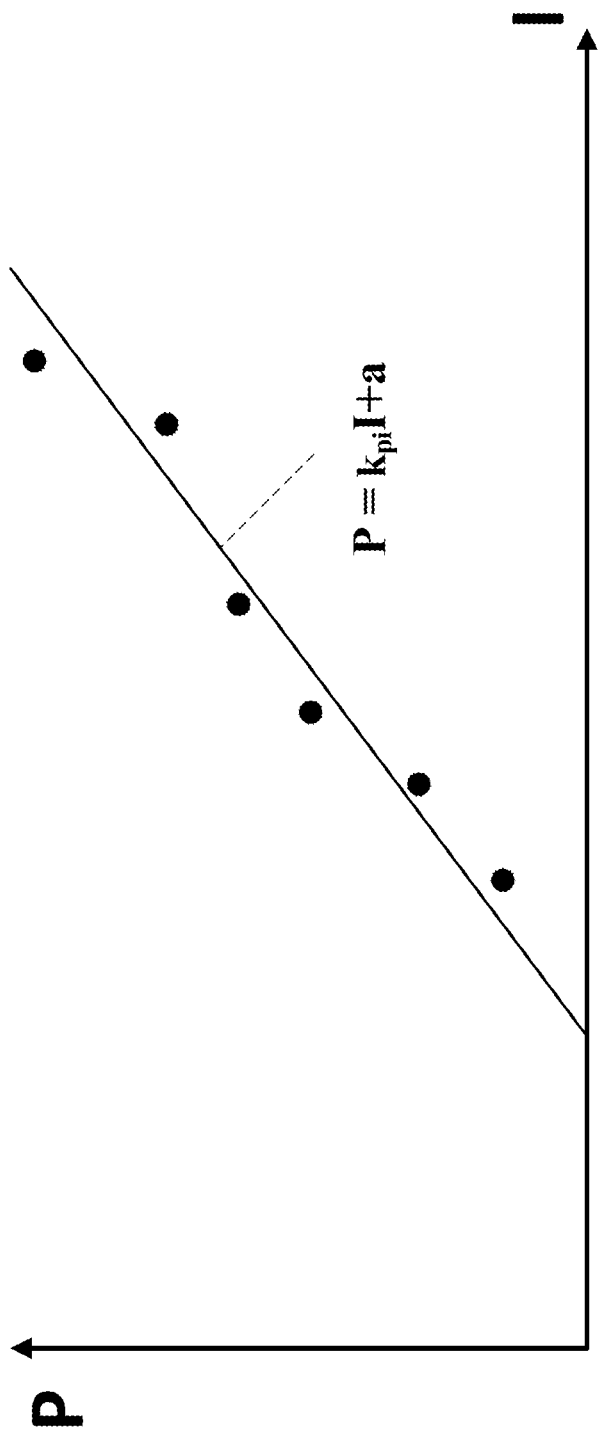
FIG. 2 is a plot of power values versus current values suitable for calibrating and/or adjusting optical power for a laser, in accordance with an exemplary embodiment of the disclosure.
Figure 3:
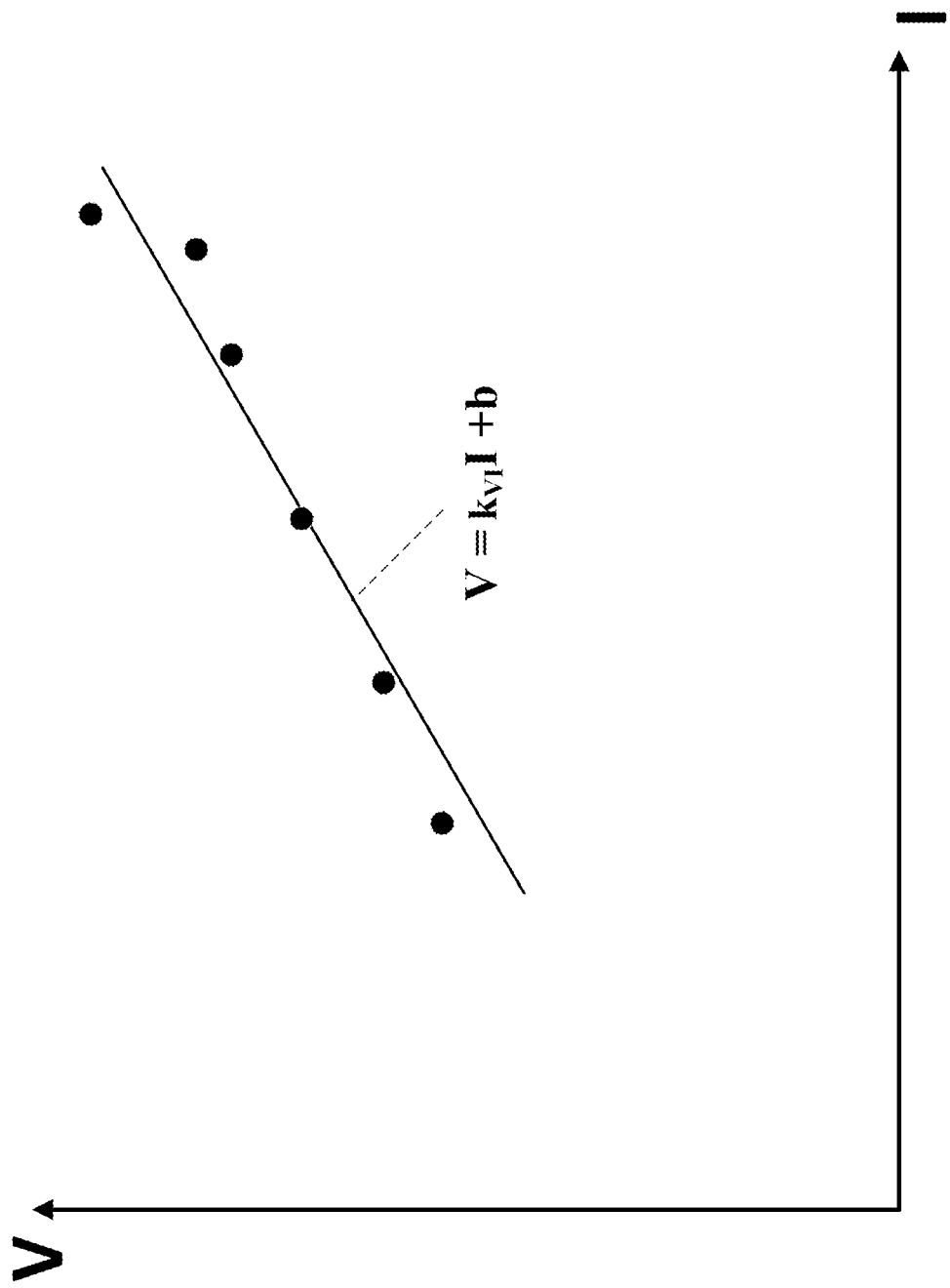
FIG. 3 is a plot of voltage values versus current values suitable for calibrating and/or adjusting optical power for a laser, in accordance with an exemplary embodiment of the disclosure.
Figure 4:
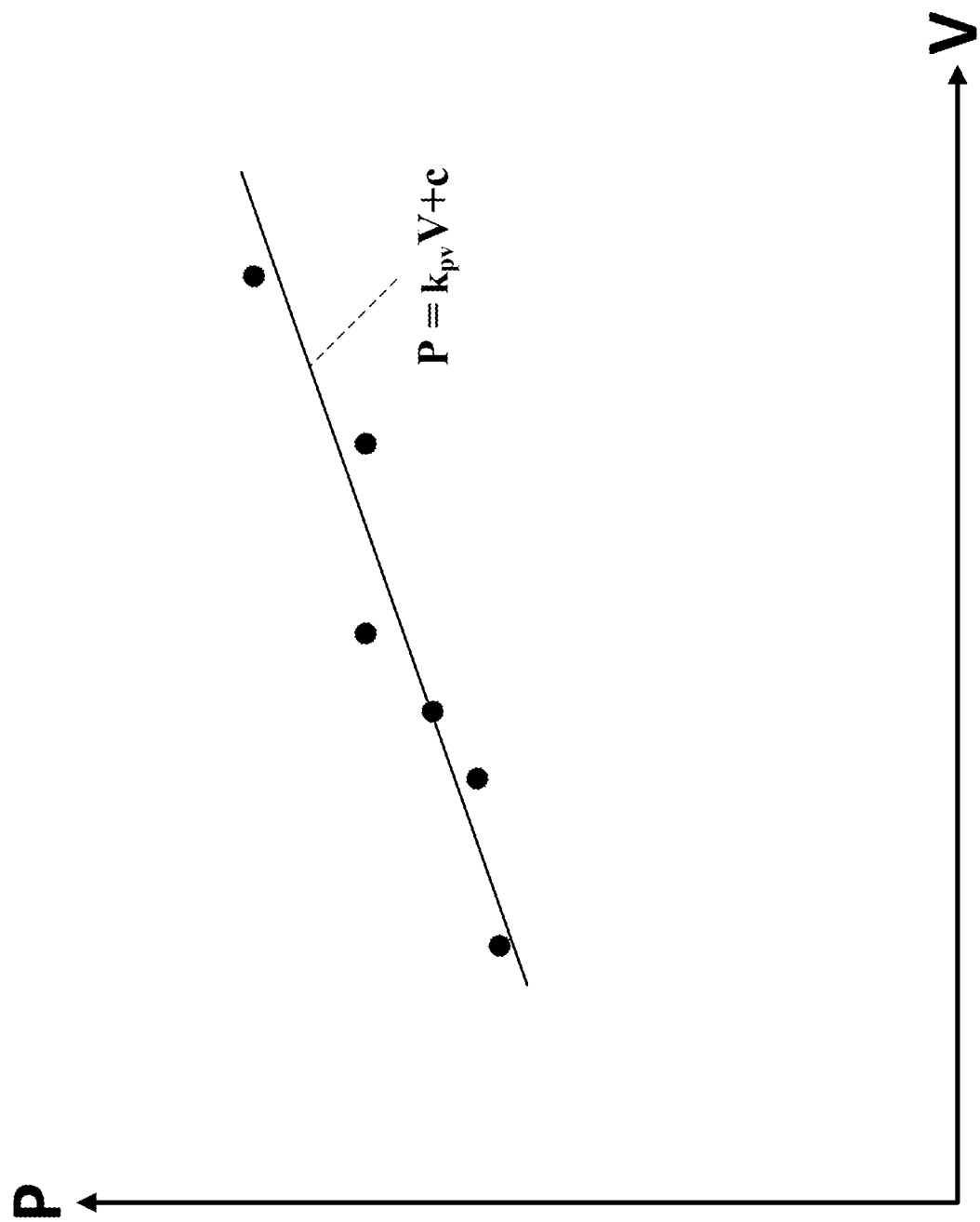
FIG. 4 is a plot of power values versus voltage values suitable for calibrating and/or adjusting optical power for a laser, in accordance with an exemplary embodiment of the disclosure.

In general, FIGS. 2, 3, and 4 provide details relating to parameters associated with a particular laser operating with certain optical losses during a calibration or laser characterization process. In turn, the values of laser parameters obtained during calibration/characterization of the laser may then be used to optimize or improve the operation of the laser using the control loop of FIG. 5 discussed in more detail below.

In some embodiments, control system 50 is a circuit which provides a current on the gain chip and also reads the corresponding voltage on the gain chip. The current that is applied on the gain chip is calculated by a microprocessor. In some embodiments, the microprocessor is part of control system 50. In other embodiments, the microprocessor is in electrical communication with control system 50.

Figure 5:
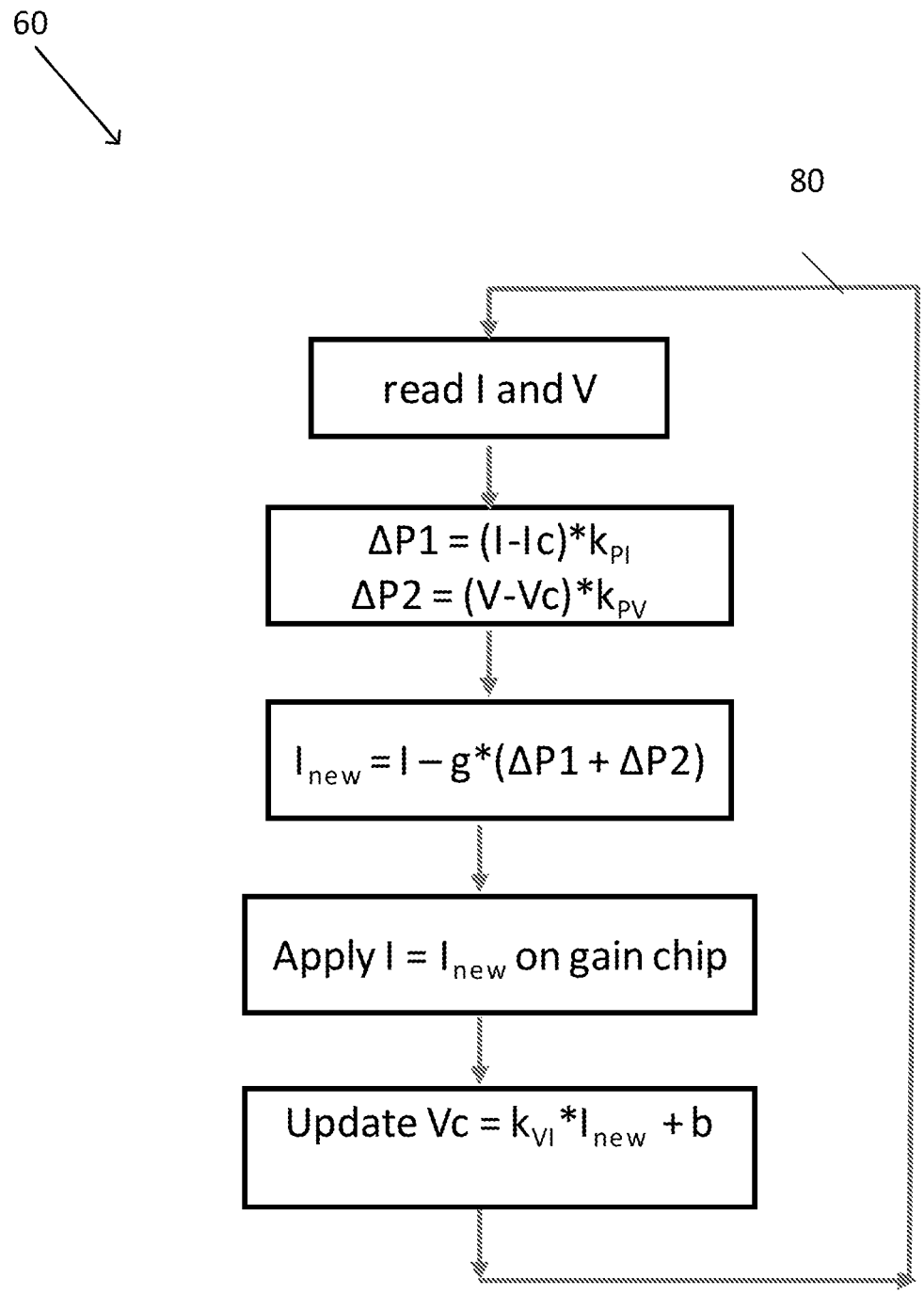
FIG. 5 is a flowchart of a power control loop based on gain chip voltage and current, in accordance with an exemplary embodiment of the disclosure.

In some embodiments, the change in power P-over time may be represented by the change in voltage V. One or more steps in the exemplary embodiment control loop/control method 60 of the example embodiment of FIG. 5 may be used. The example embodiment of FIG. 5 illustrates an example control loop for a laser such as a tunable laser. In various embodiments, the control loop is responsive to and compensates for changes in gain chip voltage and/or gain chip current based on optical losses measured during calibration changing or drifting during laser operation. The control loop and steps of FIG. 5 allow the actual output power of the tunable laser to be adjusted using the control system 50 by updating a voltage value such as a target voltage value or a calibration voltage value by changing current applied to gain chip by control system or other regulated current source or other device or circuit.

As shown in FIG. 5, in one embodiment, initially current values I and voltage values V are read or measured from the gain chip of the laser. The extent to which the optical power of the laser deviates from the target power Pt is calculated or determined. This deviation of the optical power can be evaluated based on the contribution of the current deviating from the calibration current and the contribution of the voltage deviating from the calibrated voltage values. The contribution of deviations from the calibration current maybe represented as ΔP1. The contribution of deviations from the calibration voltage maybe represented as ΔP2. These relationships are shown below in Eq. 6 and Eq. 7.

$$\Delta P1 = (I - Ic) \times K_{PI} \quad \text{(Eq. 6)}$$

$$\Delta P2 = (V - Vc) \times K_{pv} \quad \text{(Eq. 7)}$$

The and paramters, which track changse relative to calibration current Ic and calibration voltage Vc, may be combinded to together and adjusted by a proportionality factor g prior to be being subject from the measured current value I to obtain a new current value Inew as shown in Eq. 8 below. The parameter g is a gain factor for adjustment or scaling in response to the sum of ΔP1 and ΔP2.

$$I_{new} = I - g \times (\Delta P1 + \Delta P2) \quad \text{(Eq. 8)}$$

Next, the calibration voltage value corresponding to $I_{new}$ for the gain chip is calculated by Eq.5, and updated with a new voltage value shown as Vc in FIG. 5 as shown in Eq. 9 below.

$$V_C = k_{VI} \times I_{new} + b \quad \text{(Eq. 9)}$$

At this point, with an updated calibration gain voltage value, the loop repeats and returns to measure/read the actual current value I and voltage value V. In various embodiments, Pt can be from about 0.1 dBm to about 20 dBm. In some embodiments, the current values, I can range from about 1 mA to about 600 mA. In various embodiments, the voltage values V may range from about 1 V to about 5 V. The foregoing ranges may apply to all of the various P, I, and V values referenced herein, without limitation, in various embodiments.

Figure 6:
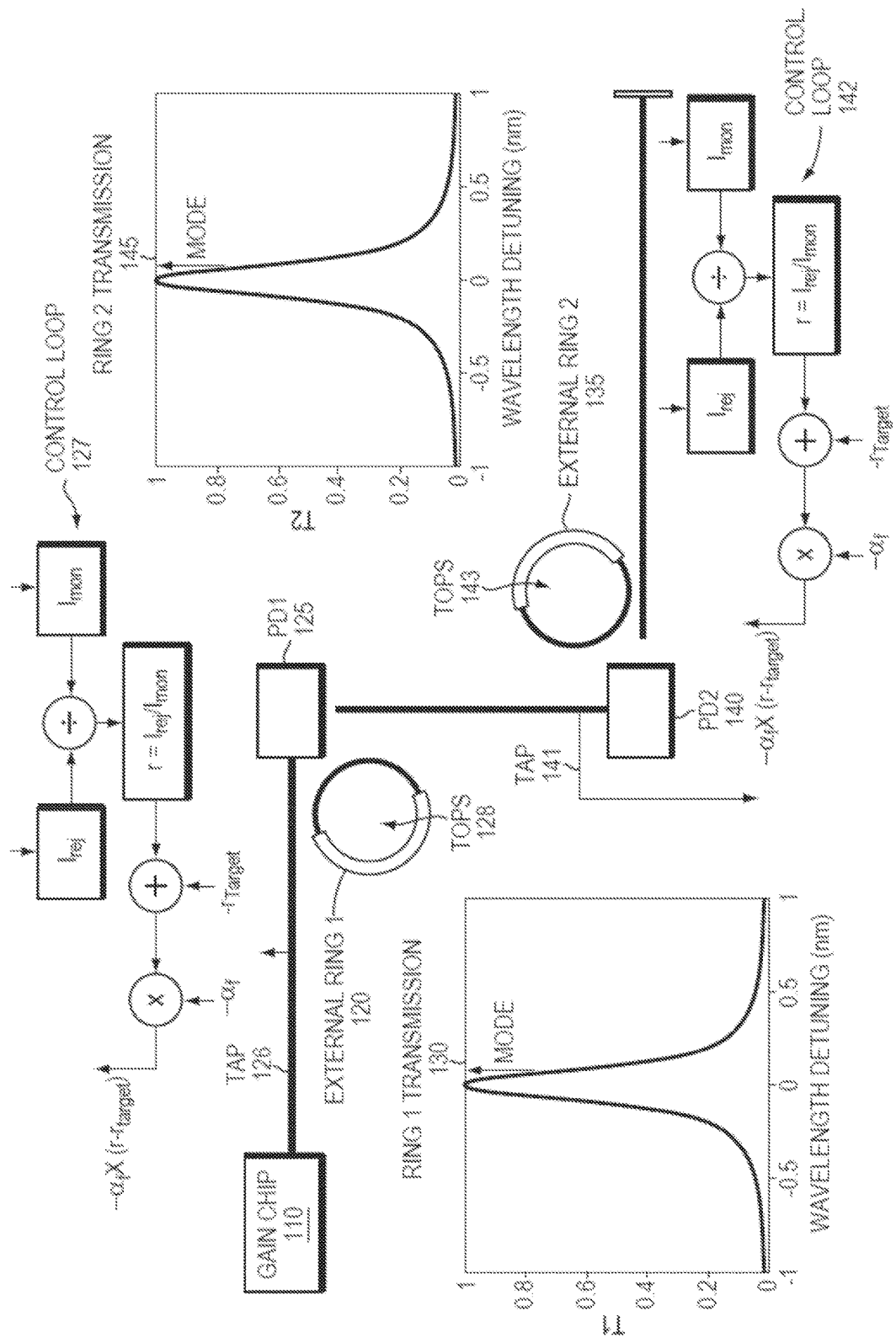
FIG. 6 is a simplified illustration of a tunable laser with two ring resonators, in accordance with an exemplary embodiment of the disclosure.

The example embodiment of FIG. 6 illustrates a laser cavity that includes gain chip and two intra-cavity ring filters. In addition to wavelength tuning, the ring filters are also suitable for calibrating and adjusting to improve output power levels using the various embodiments disclosed herein. Various embodiments and features described herein may be applied to the laser configuration described in FIG. 6. As discussed herein, data points may be collected during sweeping of a given laser embodiment. In the calibration process for Eq.1 and Eq.2, by sweeping the current applied on the gain chip 110, the voltage values can be read from the circuit that measures the voltage, and the optical output power values can be read from an optical power meter.

In the calibration process for Eq. 3, by sweeping/changing electrical powers applied on thermal optical phase shifters (TOPS) 128 and 135, the total optical loss due to phase misalignment of Ring 1 (120) and Ring 2 (135) is swept/changed. This phase misalignment is also shown by changes in PD1 (125) and PD2 (140) readings. The resulted optical loss change, which can be represented by the gain chip voltage change, leads to optical power change. By reading the voltage values and the optical power values, the correlation of P and V are obtained, as shown in Eq. 3. Various voltage, current, and power values can be measured and linearized per equations 1-9 and the control loop specified in FIG. 5 to update the current applied to the gain chip to improve output power levels of the laser.

In the example embodiment of FIG. 6, gain chip 110 feeds intra-cavity ring 1 120. Rejection photodiode PD1 125 is fed off light rejected from intra-cavity ring 1 120. PD1 125 and tap 126 provide input to control loop 127 that provides feedback to thermos-optic phase shifters (TOPS) 128. TOPS 128 is adjusted based on feedback to detune intra-cavity ring 1 120 to match ring 1 transmission graph 130. Output from intra-cavity ring 1 120 feeds intra-cavity ring 2 135. Rejection photodiode PD2 140 is fed off light rejected from intra-cavity ring 2 135. PD2 140 and tap 141 provide input to control loop 142 that provides feedback to TOPS 143. TOPS 143 is adjusted based on feedback to detune intra-cavity ring 1 135 to match ring 1 transmission graph 145.

In the embodiment of FIG. 6, in order to achieve low phase noise (low linewidth), the tunable laser is operated with the mode on the long wavelength side of the ring transmission spectrum. In this embodiment, instead of targeting at zero PD current level, a raised target level of PD currents is used. As shown in this embodiment, by controlling the ring phase, i.e., via thermos-optic phase shifters (TOPS) on the rings, and reading the PD currents as feedback, the tuning process can when the rejection PD currents (normalized by the monitor PD current, which indicates the total optical power) are within a target range around the target level.

In many embodiments, the present disclosure may enable a tunable laser to achieve high optical power (about 16 dBm±about 0.5 dB), low electrical power consumption (about 2.5 W totally), and low linewidth (<about 100 kHz). Without the use of a control loop, it may be difficult to achieve±about 0.5 dB power accuracy. In most embodiments, as tunable lasers age, power control accuracy of the laser degrades due to optical loss change. In most embodiments, it is difficult to monitor the optical loss directly. Since the gain chip voltage change is correlated with optical loss change, here the real-time gain chip voltage is used to infer the optical power change caused by optical loss change, and this power change is also compensated by changing the gain chip current.

The instant application is related to U.S. patent application Ser. No. 16/836,274 filed Mar. 31, 2020 entitled "Tunable Laser," which is hereby incorporated herein by reference in its entirety for all purposes. This application is related to pending U.S. Provisional Patent Application Ser. No. 62/898,108 filed Dec. 19, 2019 entitled "Tunable laser"

which is hereby incorporated by reference in their entirety for all purposes. The instant application is related to U.S. patent application Ser. No. 17/017,532 filed Sep. 10, 2020 entitled "Tunable Laser," which is hereby incorporated herein by reference in its entirety for all purposes.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of controlling power output of a tunable laser comprising:
   changing optical loss during a calibration period;
   recording gain chip voltage V value changes and optical output power P value changes during the calibration period; and
   compensating for changes in gain chip voltage and/or gain chip current, using a feedback control loop, based on the correlation between the optical output power P changes and the gain chip voltage V changes, due to optical loss changes measured during the calibration period.

2. The method of claim 1, wherein the feedback control loop comprises one or more linear models, wherein each linear model comprises a coefficient determined in response to changes in optical losses of laser.

3. The method of claim 1, further comprising fitting P as a function of V to obtain a first coefficient.

4. The method of claim 3, further comprising recording gain chip current I value changes and optical output power P value changes during the calibration period.

5. The method of claim 3 further comprising fitting P as a function of I to obtain a second coefficient.

6. The method of claim 1, further comprising recording gain chip current I value changes and gain chip V value changes during the calibration period.

7. The method of claim 6 further comprising fitting V as a function of I to obtain a third coefficient.

8. The method of claim 1 further comprising mitigating gain-chip-to-photonic integrated circuit (PIC) coupling efficiency degradation using the feedback control loop, wherein the feedback control loop includes a linear model calibrated using optical loss changes.

9. The method of claim 1, wherein the calibration period is a sweep period.

10. The method of claim 1, wherein one or more steps are performed using a microprocessor.

11. A method of controlling power output of a tunable laser comprising:

reading an I value and a V value from a gain chip of a laser, wherein I is a current and V is a voltage;

calculating a first power value ($\Delta P1$) based on the I value deviating from a calibration current value;

calculating a second power value ($\Delta P2$) based on the V value deviating from a calibration voltage value;

determining a $I_{NEW}$ value, wherein $I_{NEW}$ is a new current; and applying the $I_{NEW}$ on a gain chip, wherein applying the $I_{NEW}$ on a gain chip adjusts the power output of the tunable laser.

12. The method of claim 11, wherein one or more steps are performed using a microprocessor.

13. The method of claim 11 further comprising repeating all steps during operation of the tunable laser.

14. The method of claim 11, wherein $\Delta P1=(I-Ic) \times K_{PI}$, wherein Ic is the calibration current value and $K_{PI}$ is a first linear coefficient.

15. The method of claim 14, wherein $\Delta P2=(V-Vc) \times Kpv$, wherein Vc is the calibration voltage value and Kpv is a second linear coefficient.

16. The method of claim 15, wherein $I_{new}=I-g*(\Delta P1+\Delta P2)$, wherein g is a proportionality factor.

17. The method of claim 15, wherein the Ic and Vc are obtained during a calibration period.

18. The method of claim 17 further comprising varying optical losses of tunable laser during the calibration period.

* * * * *